US012454127B2

(12) United States Patent
Wijnheijmer et al.

(10) Patent No.: US 12,454,127 B2
(45) Date of Patent: Oct. 28, 2025

(54) INK JET MAINTENANCE SPIT PATTERN

(71) Applicant: Canon Production Printing Holding B.V., Venlo (NL)

(72) Inventors: Albertine P. Wijnheijmer, Venlo (NL); Bart Teussink, Venlo (NL); Johannes A.T. Gollatz, Venlo (NL); Jacques J.M. Geraets, Venlo (NL); Gerhardus R.B. Leus, Venlo (NL)

(73) Assignee: Canon Production Printing Holding B.V., Venlo (NL)

( * ) Notice: Subject to any disclaimer, the term of this patent is extended or adjusted under 35 U.S.C. 154(b) by 231 days.

(21) Appl. No.: 18/135,443

(22) Filed: Apr. 17, 2023

(65) Prior Publication Data

US 2023/0271414 A1 Aug. 31, 2023

Related U.S. Application Data

(63) Continuation of application No. PCT/EP2021/079807, filed on Oct. 27, 2021.

(30) Foreign Application Priority Data

Oct. 29, 2020 (EP) .................................... 20204756

(51) Int. Cl.
*B41J 2/045* (2006.01)
*B41J 2/165* (2006.01)

(52) U.S. Cl.
CPC ....... *B41J 2/04516* (2013.01); *B41J 2/04586* (2013.01); *B41J 2/16526* (2013.01); *B41J 2/16529* (2024.05)

(58) Field of Classification Search
CPC ................ B41J 2/04516; B41J 2/04586; B41J 2/16526; B41J 2/16529
See application file for complete search history.

(56) References Cited

U.S. PATENT DOCUMENTS

2017/0096013 A1* 4/2017 Oi ........................ B41J 2/04588

FOREIGN PATENT DOCUMENTS

| | | | |
|---|---|---|---|
| EP | 2 500 173 | A1 | 9/2012 |
| JP | 2009-12283 | A | 1/2009 |
| JP | 5177868 | B2 | 4/2013 |
| JP | 2014-43070 | A | 3/2014 |
| JP | 2017-1242 | A | 1/2017 |
| JP | 2017-61121 | A | 3/2017 |

OTHER PUBLICATIONS

International Search Report, issued in PCT/EP2021/079807, dated Jan. 20, 2022.
Written Opinion of the International Searching Authority, issued in PCT/EP2021/079807, dated Jan. 20, 2022.

* cited by examiner

*Primary Examiner* — Thinh H Nguyen
(74) *Attorney, Agent, or Firm* — Birch, Stewart, Kolasch & Birch, LLP

(57) ABSTRACT

A method of ink jet printing using an ink jet imaging device including a plurality of nozzles arranged for expelling droplets of an ink by actuation of an ink channel includes the steps of: a) providing a bit map of a spit pattern comprising an arrangement of refresh dots to be printed by each of the plurality of nozzles; and d) printing the bitmap of the spit pattern. The spit pattern includes a plurality of clusters of refresh dots, each cluster including at least two sequential refresh dots expelled from a single nozzle. A spit pattern for use in such a method is disclosed.

17 Claims, 3 Drawing Sheets

INK JET MAINTENANCE SPIT PATTERN

CROSS REFERENCE TO RELATED APPLICATIONS

This application is a Continuation of PCT International Application No. PCT/EP2021/079807, filed on Oct. 27, 2021, which claims priority under 35 U.S.C. 119(a) to patent application No. 20204756.9, filed in Europe on Oct. 29, 2020, all of which are hereby expressly incorporated by reference into the present application.

FIELD OF THE INVENTION

The present invention relates to an improved spit pattern for maintenance of jetting stability of a plurality of nozzles comprised in an ink jet imaging device.

BACKGROUND ART

It is known in the art, in particular in the art of page wide ink jet printing, that so-called refresh dots need to be printed in order to maintain the jetting stability of the plurality of nozzles of an ink jet imaging device. Due to evaporation of liquids inside or in the vicinity of the nozzle openings through which ink droplets (or any other functional liquid) are expelled, liquid (ink) properties may change, in particular when time intervals between two subsequent droplet ejections is relatively long. This potentially leads to all kinds of print artifacts caused by impairment of jetting stability. To prevent or mitigate the impairment of jetting stability, intermediate droplet ejections may be used to refresh the ink present in the nozzles. These intermediate droplet ejections provide so-called refresh dots, which are not part of the image to be printed, but arranged or planned in a so-called spit pattern that is superimposed on the image bitmap (the spit-pattern bitmap is added to the image bitmap). It is an objective to provide a spit pattern that is hardly visible to the naked human eye. To achieve this, it is of paramount importance that the number of required refresh dots (per nozzle) is as low as possible and that the refresh dots are well distributed across the entire print surface of the print substrate. In other words a sparse spit pattern is preferred. In the art, several kinds of spit patterns are known, for example a spit pattern derived based on a blue noise mask.

It is a disadvantage of the spit patterns known in the art is that these are not sparse enough, so that the visibility limit is exceeded, hence imparting the print quality (i.e. creating a grey appearing background).

SUMMARY OF THE INVENTION

It is an object of the present invention to prevent or at least mitigate the above disadvantage. This object is achieved by a printing method according to claim 1.

In the method according to the present invention, a spit pattern is used that comprises at least two sequential refresh dots that are expelled from the same nozzle. In the context of the present invention the at least two sequential refresh dots expelled from the same nozzle are termed a cluster of refresh dots, or short a cluster. This method enables a nozzle to return to its original jetting state and allows the interval between refresh actions (i.e. between two clusters) to be increased, hence leading to overall less required refresh dots for optimal jet stability and print quality.

In principle, a cluster of refresh dots is a number of directly consecutively printed dots by a single nozzle in a single refresh action. In other words, a cluster of refresh dots replaces a single dot of a single refresh action. A cluster of refresh dots is therefore defined as at least two directly consecutively printed dots at a first time interval $t_1$. Consecutively printed clusters of refresh dots printed by a single (i.e. the same) nozzle are printed at a second time interval $t_2$, which is (much) longer than the time interval between directly consecutively printed dots in a cluster (i.e. $t_2 >> t_1$), hence the refresh dots printed by a single nozzle are not equidistantly distributed in the so called spit pattern that is superimposed on the image to be printed.

The spatial distribution of clusters of refresh dots of neighboring nozzles is selected such that the distance between the clusters is maximized, such that the visibility limit is not exceeded.

In an embodiment, the at least two sequential refresh dots of a cluster, in the context of the present invention to be construed as two directly consecutively printed dots by a single nozzle in a single refresh action, are printed at a time interval ($t_1$) of between 0.5 ms and 100 ms, preferably between 1 ms and 50 ms, more preferably between 1.5 ms and 15 ms.

In this embodiment it is ensured that the refreshment of liquid (ink) in and/or in the vicinity of the nozzles is refreshed during early stages of liquid evaporation of liquids in and/or in the vicinity of nozzles. For example for a 1200 dpi print head with a drop on demand (DoD) frequency of 32 kHz, the ejection cycle of a nozzles is 31.25 μs. Expelling 8 subsequent droplets with 50 pixels in between each droplet, the total ejection time of a cluster of subsequent droplets equals 7 (between first and eighth droplet)*50 (number of pixels between each droplet)*31.25 μs (ejection cycle time)=10.9 ms. Please note that the method according to the present invention is also applicable to other print head principles (e.g. thermal print heads), as long as the time scale of ink refreshment is shorter than the evaporation scale in and/or in the vicinity of the nozzles. Those skilled in the art know how to apply the principles of the present invention to other print head principles.

In an embodiment, the spit pattern comprises a first cluster of at least two sequential refresh dots and a second cluster of at least two sequential refresh dots, the first cluster and the second cluster are printed at a time interval ($t_2$) of at least 125 ms, preferably at least 250 ms, more preferably at least 500 ms.

The principles of how to determine a suitable spit pattern comprising at least two sequential dots printed with the same nozzle (clusters) with appropriate cluster spacing is explained later in this disclosure.

In an embodiment, the method comprises the steps of:

a) providing a bit map of a spit pattern comprising an arrangement of refresh dots to be printed by each of the plurality of nozzles;
b) providing a bitmap of an image to be printed;
c) superimposing the bitmap of the spit pattern onto the bitmap of the image to be printed and hence creating an execution bitmap;
d) printing the execution bitmap;

characterized in that the spit pattern comprises a plurality of clusters of refresh dots, each cluster comprising at least two sequential refresh dots expelled from a single nozzle.

In the context of the present invention and as indicated above "a single nozzle" has the same meaning as "the same nozzle". Further the wording "sequential" in the context of at least to printed dots within a cluster means "directly consecutively".

In another aspect, the present invention relates to a spit pattern for use in a method according the present invention. The spit pattern comprises a plurality of clusters of refresh dots, each cluster comprising at least two sequential refresh dots expelled from a single nozzle. In other words, the spit pattern is characterized in that for each of the plurality of nozzles a cluster of at least two sequential refresh dots is arranged.

In an embodiment, the at least two sequential refresh dots are arranged at a distance of one another such that on a time scale the sequential refresh dots are printed at a time interval of between 0.5 ms and 100 ms, preferably between 1 ms and 50 ms, more preferably between 1.5 ms and 15 ms.

In practice, for a drop on demand (DoD) frequency of 32 kHz this translates in to a spacing between sequential refresh dots of between 16 and 3200 pixels, preferably between 32 and 1600 pixels, more preferably between 48 and 480 pixels.

In an embodiment, the spit pattern comprises a first cluster of at least two sequential refresh dots and a second cluster of at least two sequential refresh dots which are arranged at a distance of one another such that the first cluster and the second cluster are printed at a time interval of at least 125 ms, preferably at least 250 ms, more preferably at least 500 ms.

In practice, for a drop on demand (DoD) frequency of 32 kHz this translates into a spacing between two subsequent clusters of refreshment dots of at least 4000 pixels, preferably at least 8000 pixels, more preferably at least 16000 pixels.

In an embodiment, the pixels are printed at a frequency of 32 kHz and the spit pattern comprises a first cluster of eight sequential refresh dots and a second cluster of eight sequential refresh dots, which clusters are arranged at a distance of 16000 pixels from one another. The distance between each of the eight pixels each cluster is 50 pixels.

In further embodiments, a spit pattern in accordance with the present invention is used in a smart way, for example by taking into account the bit map of the image to be printed (e.g. limiting imposing the spit pattern to those parts of the image where the nozzle idle times exceed an evaporation time limit) or based on actual jetting status of the nozzles determined e.g. by electric feed-back from the piezo actuated nozzles.

BRIEF DESCRIPTION OF THE DRAWINGS

For a more complete understanding of the invention and the advantages thereof, exemplary embodiments of the invention are explained in more detail in the following description with reference to the accompanying drawing figures, in which like reference characters designate like parts and in which.

DETAILED DESCRIPTION

In ink jet printing systems, in particular in printing systems using page wide image formation, refresh dots are printed to deal with evaporating ink by jetting away the deteriorated ink out of idle nozzles and hence at least partially refreshing the ink (or other functional liquid) in functional parts of the jetting device. The amount of refresh dots should be as low as possible. Too many refresh dots may create a haze in the background, i.e. in case of black ink a grey background.

Figure 2:
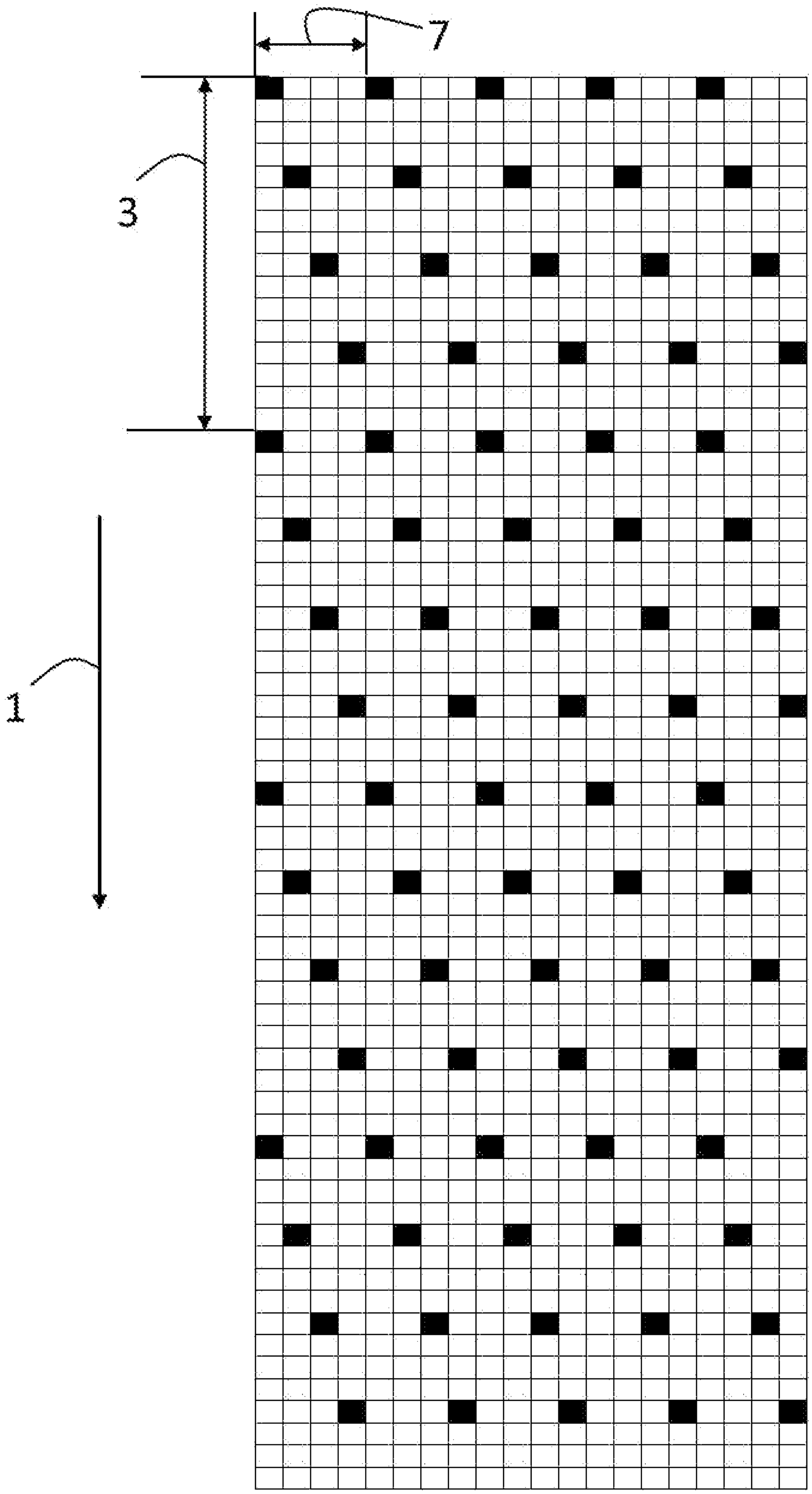
FIG. 2 schematic representation of a spit pattern comprising less dots: 1 dot in frequency 1 on 2000 pixels.

In any printing method a 1 dot in x pixels spit pattern that is on the boundary of visibility can be empirically determined, in the current examples 1 dot in 2000 pixels as shown in FIG. 2. When clustering n (n=2, 3, 4, etc.) dots originating from a single nozzle, the pixel distance between dot clusters increases with a factor f=n·x (present example n=2, f=2.2000=4000). Essential for staying below the visibility limit is that the dots are evenly spaced. Therefore, the minimum distance between two adjacent dots in a cluster is determined in accordance with the minimum distance between dots in a 1 dot in x pixels spit pattern, which is on or below the visibility limit. The minimum distance between dots is calculated by taking the square root of the 1 dot in x pixels distance, because the dots closest to one another originate from different nozzles: $d=\sqrt{(x)}$. For the examples, the 1 dot in 2000 pixels pattern, the minimum distance is $\sqrt{(2000)}=44.7$ pixels. Hence a pixel distance between two adjacent dots of 50 pixels is sufficient to stay below the visibility limit. Maintaining a certain distance between two subsequently ejected droplets also prevents coagulation of droplets and/or creating large ink blobs in the image which would impart visibility significantly.

Typically, the allowed refresh rate is 1 on 2000 pixels for a 1200 dpi system in order to stay below the visibility limit. Therefore, every nozzle jets a drop every 2000 pixels, additional to the intended bitmap. These refresh dots are typically placed in a regular pattern, because this leads to the lowest visibility.

It has been found that evaporation in and in the vicinity of nozzle openings of an ink jet imaging device (print head) slows down after approximately 200 ms after ejection of an ink droplet from the nozzle. In the interval 0-200 ms after ejection of an ink droplet the amount of evaporated water is significantly higher than thereafter (e.g. in the interval from 200 ms-400 ms).

Further, it has been found that a single refresh dot (one droplet ejection) is not capable of perfectly restoring the jetting stability to its original state.

Without wanting to be bound to any theory, it is believed that at least two sequentially expelled droplets provide an improved refreshment of the ink in an individual nozzle, to such an extent that the time interval between subsequent refreshment cycles (i.e. clusters) can be increased. Overall this leads to maintenance of jetting stability with less refresh dots, in practice a reduction of required refresh dots may be a factor 2. It has been found that up to 8 sequentially expelled droplets (and maybe even beyond that number) still provides improvement.

The Figures show schematic representations of spit patterns in tabular form. The rows (horizontal) represent a nozzle array. In a single row actuated nozzles are indicated with black squares. In a column (vertical) it can be seen when a single nozzle is actuated to print a refresh dot. The paper feed direction is indicated with arrow 1. The examples shown in the Figures and described hereafter are based on printing with a drop on demand frequency (DoD) of 32 kHz, which implies a droplet cycle time of 31.25 μs. For examples, the time between two dots printed in a 1 dot in 1 on 1000 spit pattern (FIG. 1) is 31.25 ms.

Figure 1:
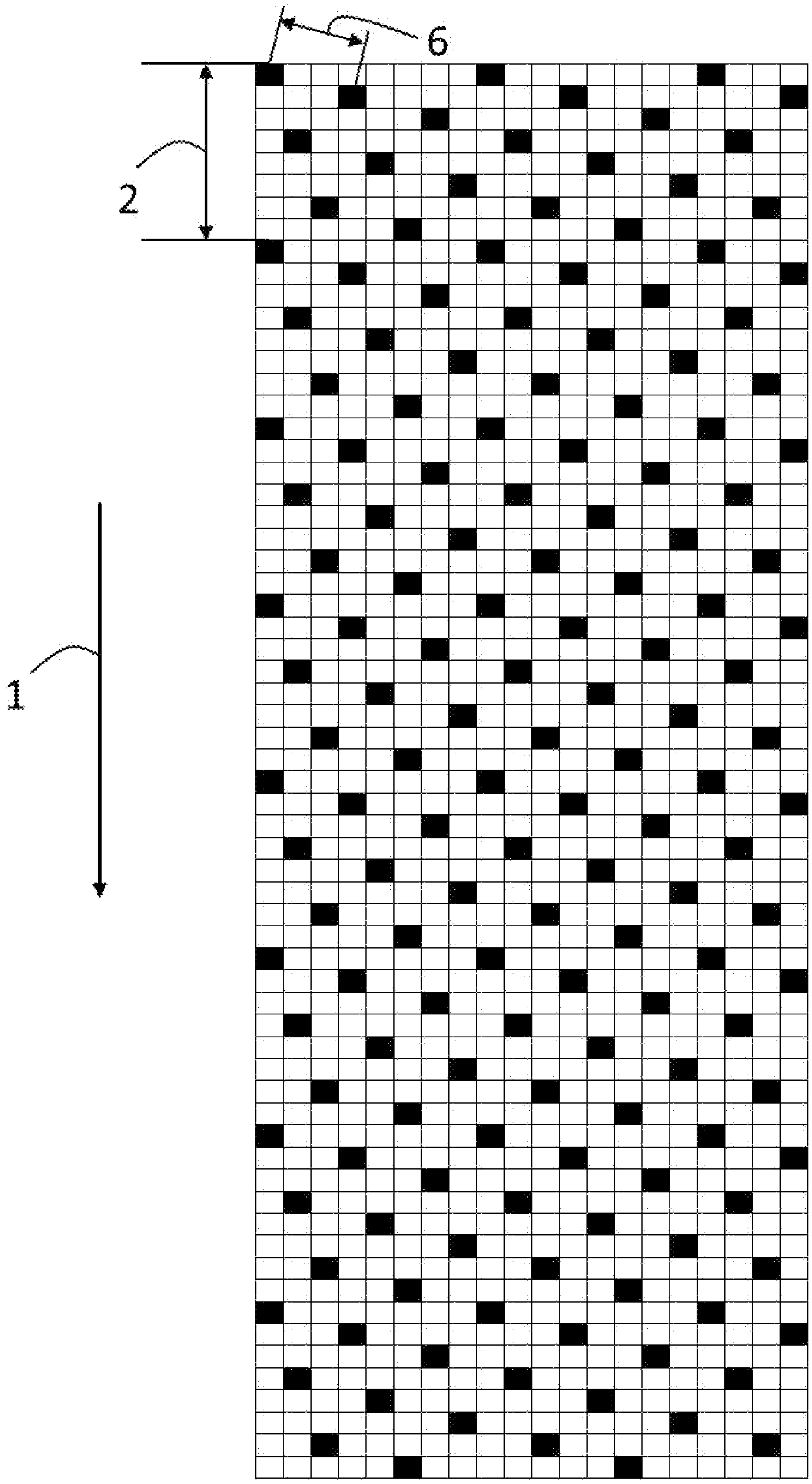
FIG. 1 schematic representation of a normal spit pattern (prior art): 1 dot in frequency 1 on 1000 pixels.

FIG. 1 shows a schematic representation of a normal spit pattern according to the prior art. The distance, indicated with double arrow 2, between two fire moments of the same nozzle is 1 in 1000 pixels (so a single droplet is fired, i.e. 1 refresh dot, every 1000 pixels). In practice such spit pattern provides sufficient refreshment of the ink in the nozzles. The average distance between neighboring refresh dots (in all directions) is equal to √1000≈32 pixels, indicated with double arrow 6 (not on scale). However, as indicated above, in for a 1200 dpi system, a 1 refresh dot in a 1 on 2000 frequency is required in order to stay below the visibility limit. Such a pattern is shown in FIG. 2.

FIG. 2 shows a schematic representation of a sparser spit pattern, meeting the required visibility limit for a 1200 dpi printing system. Again the same nozzle array is shown. Each individual nozzle now spits once every 2000 pixels, which is indicated with double arrow 3. The distance between two sequential refresh dots from the same nozzle has doubled compared to the pattern shown in FIG. 1. The average distance between neighboring refresh dots (in all directions) is equal to √2000≈45 pixels, indicated with double arrow 7 (not on scale). In practice such spit pattern has proven to provide insufficient refreshment of the ink in the nozzles to maintain the jet stability on a desired level. The print quality significantly decreases.

Figure 3:
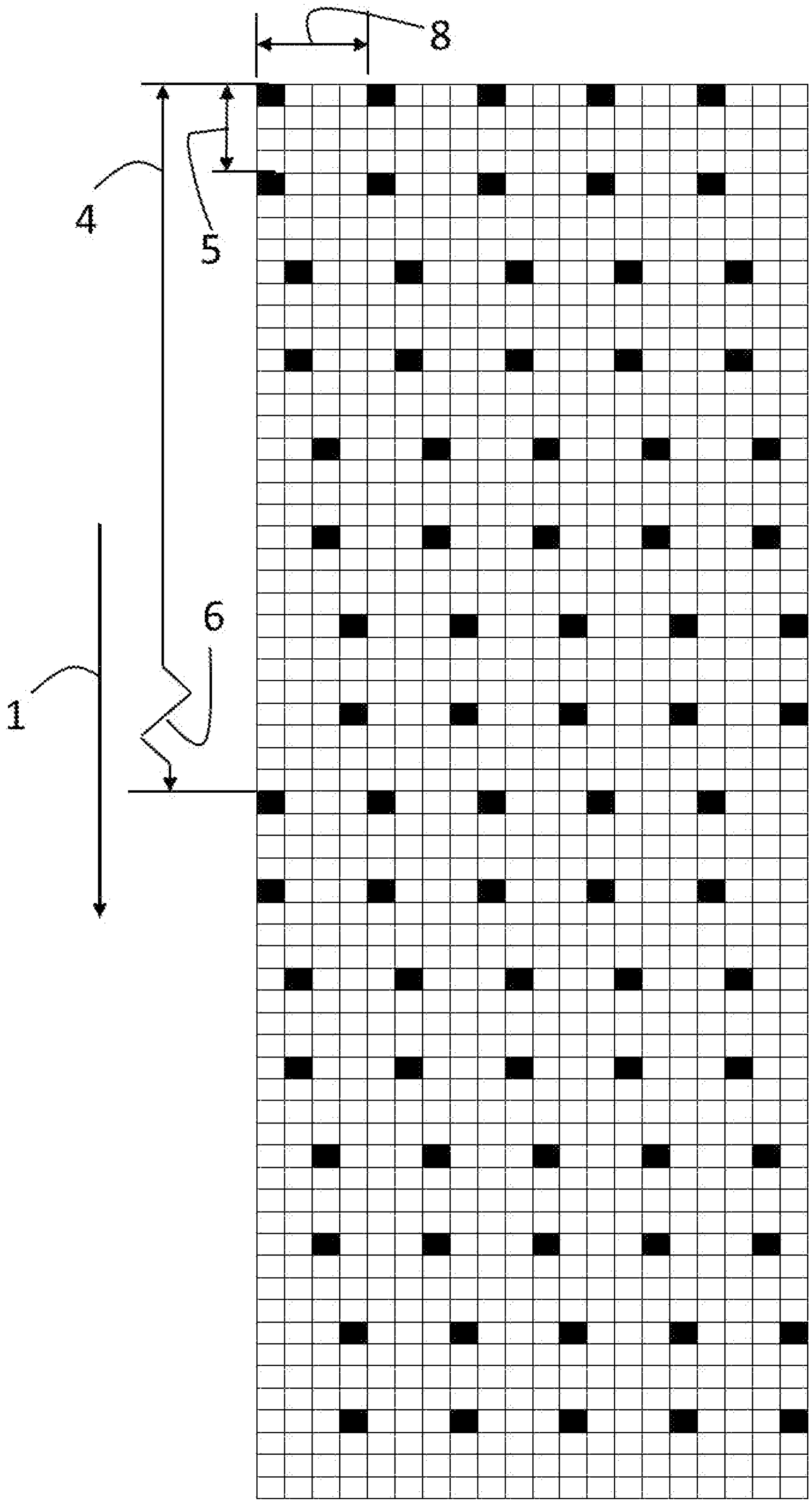
FIG. 3 schematic representation of a spit pattern according to the present invention: cluster of 2 sequential dots spaced 50 pixels apart in frequency 1 (cluster) on 4000 pixels.

FIG. 3 shows a spit pattern used in a method according to the present invention. At first glance it can be seen that the number of refresh dots is comparable to the pattern shown in FIG. 2. However, in the spit pattern shown in FIG. 3, the refresh dots are clustered (clusters of two dots) and the refresh dot distance between subsequent refresh dots in a cluster of refresh dots is 50 pixels, as indicated with double arrow 5. The repeat frequency of a cluster of refresh dots has doubled compared to the pattern shown in FIG. 2 (2 dots; 1 on 4000 nozzles), as indicated with double arrow 4. The average distance between clusters is √4000≈63 pixels and the distance between subsequent refresh dots in a cluster is 50 pixels (double arrow 5), both larger than the average distance in a 1 dot in 2000 pixels pattern as shown in FIG. 2, which distance is approximately 45 pixels. Therefore, the spit pattern shown in FIG. 3 is well below the visibility limit. It is to be noted that FIG. 3 (the figures in general) is not on scale. In the present example double arrow 5 represents 50 pixels and double arrow 4 represents 4000 pixels, hence in practice double arrow 4 is a factor 80 longer than double arrow 5. To indicate this scale discrepancy double arrow 4 is interrupted as indicated with 6. In the horizontal direction (nozzle array) the average distance between refresh dots is also 50 pixels as indicated with arrow 8 (not on scale) In practice this pattern has proven to provide sufficient refreshment of ink in the nozzles to maintain the jet stability on a desired level.

Without wanting to be bound to any theory, it is believed that multiple refresh dots in a relative short time interval improves the quality of the refreshment of the ink in the nozzles significantly, which has the effect that the clusters can be repeated at a lower frequency.

Examples

Spit patterns as described in Table 1 below were applied to a 1200 dpi printing system using an in-house developed piezo based MEMS print head printing an in-house developed water-based, pigmented latex ink with high solid load. The ink compositions used comprised 20 wt % glycerol, 10 wt % solid particles (in total) and 70% water. It is noted that the present invention will work with any print head and ink combination. Droplet size was 2 pl, Drop on Demand (DoD) frequency was 32 kHz.

Table 1 shows the results of this printing experiments, wherein the judgement NOK/OK is based on whether or not the nozzles fail due to drying in of ink in or in the vicinity of a nozzle opening. Furthermore, the judgement "OK" was only awarded when no visible print artefacts known to be caused by drying-in of ink in or in the vicinity of the nozzles, such as OD (optical density) variations or line raggedness, were detected (in a visual inspection of the prints).

TABLE 1 results of print experiments

| Example | Refresh rate | # Refresh dots/m$^2$ | Spit pattern visible? | Nozzle stability OK? | Overall judgement |
|---|---|---|---|---|---|
| CE 1 | 1 × 1 on 1000 | 2.2 * $10^6$ | yes | yes | NOK |
| CE 2 | 1 × 1 on 1200 | 1.9 * $10^6$ | not available | no | NOK |
| 1 | 8 × 1 on 16000 | 1.1 * $10^6$ | no | yes | OK |

In comparative example 1 (CE 1), the print test was carried out for 1 hour during which the nozzle stability remained OK. The spit pattern was however visible in the prints.

In comparative example 2 (CE 2), some nozzles started failing after 1 minute of printing and significant loss of droplet volume and speed for all nozzles was detected after several minutes, indicating a failing droplet ejection stability.

In example 1 a cluster of 8 refresh dots at a cluster repeat frequency of 1 in 16000 pixels was applied. The total number of refresh dots was reduced by a factor 2 compared to CE 1. The distance between the dots in the cluster was 50 pixels, corresponding to the average distance between the dots in a regular 1 dot in 1 on 2000 pixels frequency. The 50 pixel distance is selected to prevent subsequent droplets forming a large ink blob in the image which disturbs the visibility. In the 1 dot in 1 on 2000 pixels, the average distance between two adjacent dots (originating from different nozzles) is √(2000) (square root)=44.7 pixels. Therefore, a distance of 50 pixels does not impart visibility. Therefore, the visibility of the pattern used in Example 1 (8 refresh dots in 1 on 16000 frequency) is similar to the visibility of a 1×1 on 2000 pattern.

Without wanting to be bound to any theory, the mechanism behind the effect of the present invention is based on decreasing evaporation rate of water (or other liquid components) from ink present inside or in the vicinity of the nozzle openings: models of water evaporation from a nozzle show that water evaporation slows down after 100 ms-200 ms. The time between two subsequent spit droplets in a 1×1 on 2000 spit pattern at 32 kHz printing is 62.5 ms. The time interval between subsequent clusters in a 8×1 on 16000 spit pattern is 500 ms. The amount of water loss in 500 ms using the 8×1 on 16000 spit pattern is far less than 8 times the amount of water loss in 62.5 ms when using the 1×1 on 2000 spit pattern (the time between the first and the eighth dot is 7 times 2000 pixels, which is 437.5 ms). Most of the evaporation occurs in the 100 ms-200 ms after droplet ejection (i.e. starting with fresh ink in the nozzle). Due to slowing down of evaporation, most of the damage caused by evaporation has already been done in the first 100 ms-200 ms. Furthermore, a single refresh dot is not sufficient to bring the jetting stability of the nozzle back to the initial state. These combined effects lead to the fact that the jet stability of a nozzle is better reset to its initial state by jetting 8 droplet in a row (each 50 pixels apart, distance between first and eighth dot is 350 pixels, which in the present example equals 10.9 ms) repeated every 500 ms, instead of 1 droplet repeated every 62.5 ms.

In conclusion, by clustering the refresh dots printed by a single nozzle in groups of at least 2 subsequently expelled droplets (in Example 1 a cluster of 8 subsequently expelled droplets) with relatively short time interval (in the present example 50 pixels) enables reducing the total number of refresh dots required to maintain jet stability and hence the print quality on a desired level.

The optimum number of refresh dots in a cluster may be higher than represented by FIG. 3 or even higher than described above for Example 1 (8×1 on 16000) and may be dependent on the type of print head and ink used, the design of air refreshment in a printing device and environmental conditions. Inventors have found that clusters of up to 8 droplets still provided improvement.

The invention claimed is:

1. A method of ink jet printing using an ink jet imaging device comprising a plurality of nozzles arranged for expelling droplets of an ink by actuation of an ink channel, the method comprising the steps of:

a) providing a bit map of a spit pattern comprising an arrangement of refresh dots to be printed by each of the plurality of nozzles; and d) printing a bitmap of the spit pattern, wherein the spit pattern comprises a plurality of clusters of refresh dots, each cluster comprising at least two sequential refresh dots expelled from a single nozzle, the at least two sequential refresh dots expelled sequentially from the single nozzle with no dots of the refresh dots being expelled between a first time of the expulsion of a first of the at least two sequential refresh dots and a second time of the expulsion of a second of the at least two sequential refresh dots.

2. The method according to claim 1, wherein the at least two sequential refresh dots of a cluster are printed at a time interval of between 0.5 ms and 100 ms.

3. The method according to claim 2, wherein the spit pattern comprises a first cluster of at least two sequential refresh dots and a second cluster of at least two sequential refresh dots, the first cluster and the second cluster are printed at a time interval of at least 125 ms.

4. The method of ink jet printing according to claim 2, wherein the method further comprises the steps of:

b) providing a bitmap of an image to be printed;

c) superimposing the bitmap of the spit pattern onto the bitmap of the image to be printed and hence creating an execution bitmap; and e) printing the execution bitmap.

5. A spit pattern for use in the method according to claim 2, wherein the spit pattern comprises a plurality of clusters of refresh dots, each cluster comprising at least two sequential refresh dots expelled from a single nozzle.

6. The method according to claim 1, wherein the spit pattern comprises a first cluster of at least two sequential refresh dots and a second cluster of at least two sequential refresh dots, the first cluster and the second cluster are printed at a time interval of at least 125 ms.

7. The method of ink jet printing according to claim 6, wherein the method further comprises the steps of:

b) providing a bitmap of an image to be printed;

c) superimposing the bitmap of the spit pattern onto the bitmap of the image to be printed and hence creating an execution bitmap; and e) printing the execution bitmap.

8. A spit pattern for use in the method according to claim 6, wherein the spit pattern comprises a plurality of clusters of refresh dots, each cluster comprising at least two sequential refresh dots expelled from a single nozzle.

9. The method of ink jet printing according to claim 1, wherein the method further comprises the steps of:

b) providing a bitmap of an image to be printed;

c) superimposing the bitmap of the spit pattern onto the bitmap of the image to be printed and hence creating an execution bitmap; and e) printing the execution bitmap.

10. A spit pattern for use in the method according to claim 9, wherein the spit pattern comprises a plurality of clusters of refresh dots, each cluster comprising at least two sequential refresh dots expelled from a single nozzle.

11. A spit pattern for use in the method according to claim 1, wherein the spit pattern comprises a plurality of clusters of refresh dots, each cluster comprising at least two sequential refresh dots expelled from a single nozzle.

12. The spit pattern according to claim 11, wherein the at least two sequential refresh dots are arranged at a distance of one another such that on a time scale the sequential refresh dots are printed at a time interval of between 0.5 ms and 100 ms.

13. The spit pattern according to claim 12, wherein a first cluster of at least two sequential refresh dots and a second cluster of at least two sequential refresh dots are arranged at a distance of one another such that the first cluster and the second cluster are printed at a time interval of at least 125 ms.

14. The spit pattern according to claim 11, wherein a first cluster of at least two sequential refresh dots and a second cluster of at least two sequential refresh dots are arranged at a distance of one another such that the first cluster and the second cluster are printed at a time interval of at least 125 ms.

15. The spit pattern according to claim 12, wherein the pixels are printed at a frequency of 32 kHz and wherein a first cluster of eight sequential refresh dots and a second cluster of eight sequential refresh dots are arranged at a distance of 16000 pixels, wherein the distance between each of the eight pixels of each cluster is 50 pixels.

16. The spit pattern according to claim 11, wherein the pixels are printed at a frequency of 32 kHz and wherein a first cluster of eight sequential refresh dots and a second cluster of eight sequential refresh dots are arranged at a distance of 16000 pixels, wherein the distance between each of the eight pixels of each cluster is 50 pixels.

17. The spit pattern according to claim 14, wherein the pixels are printed at a frequency of 32 kHz and wherein a first cluster of eight sequential refresh dots and a second cluster of eight sequential refresh dots are arranged at a distance of 16000 pixels, wherein the distance between each of the eight pixels of each cluster is 50 pixels.

* * * * *